United States Patent
Zhang et al.

(10) Patent No.: US 12,284,715 B2
(45) Date of Patent: Apr. 22, 2025

(54) METHODS AND APPARATUS FOR NEGOTIATING AVERAGING WINDOW IN LOW LATENCY COMMUNICATIONS

(71) Applicant: QUALCOMM Incorporated, San Diego, CA (US)

(72) Inventors: Nan Zhang, Beijing (CN); Yongjun Xu, Beijing (CN); Long Han, Shanghai (CN)

(73) Assignee: QUALCOMM Incorporated, San Diego, CA (US)

( * ) Notice: Subject to any disclaimer, the term of this patent is extended or adjusted under 35 U.S.C. 154(b) by 331 days.

(21) Appl. No.: 17/928,200

(22) PCT Filed: Jul. 28, 2020

(86) PCT No.: PCT/CN2020/105215
§ 371 (c)(1),
(2) Date: Nov. 28, 2022

(87) PCT Pub. No.: WO2022/021071
PCT Pub. Date: Feb. 3, 2022

(65) Prior Publication Data
US 2023/0217537 A1    Jul. 6, 2023

(51) Int. Cl.
*H04W 76/28* (2018.01)
*H04W 72/12* (2023.01)
*H04W 72/50* (2023.01)

(52) U.S. Cl.
CPC ........... *H04W 76/28* (2018.02); *H04W 72/12* (2013.01); *H04W 72/535* (2023.01)

(58) Field of Classification Search
CPC .... H04W 76/28; H04W 72/535; H04W 72/12
See application file for complete search history.

(56) References Cited

U.S. PATENT DOCUMENTS

2010/0112956 A1* 5/2010 Jeong ............... H04B 17/309
                                                          455/67.11
2017/0318536 A1  11/2017 Manepalli et al.
(Continued)

FOREIGN PATENT DOCUMENTS

CN        106465451 A     2/2017
CN        108616330 A    10/2018
(Continued)

OTHER PUBLICATIONS

Ericsson: "UE Assistance Information for cDRX Configuration", 3GPP TSG-RAN2 Meeting #107bis, R2-1913200 UE Assistance Information for cDRX Configuration, 3rd Generation Partnership Project, Mobile Competence Centre, 650, Route Des Lucioles, F-06921, Sophia-Antipolis Cedex, vol. RAN WG2, No. Chongqing, China, Oct. 14, 2019-Oct. 18, 2019, Oct. 4, 2019, XP051804891, 2 Pages, sections 1-3.
(Continued)

*Primary Examiner* — Alex Skripnikov
(74) *Attorney, Agent, or Firm* — Arent Fox, LLP

(57) ABSTRACT

Aspects of the present disclosure include methods, apparatuses, and computer readable media for determining a connected mode discontinuous reception (C-DRX) short cycle value, transmitting a C-DRX short cycle request to a base station, the C-DRX short cycle request including the C-DRX short cycle value, receiving a first confirmation indicating the base station accepting the C-DRX short cycle value associated with the C-DRX short cycle request, determining an averaging window value based on the C-DRX short cycle value, transmitting an averaging window request to the base station, the averaging window request including the averaging window value, receiving a second confirmation indicating the base station accepting the averaging window value associated with the averaging window request, and
(Continued)

communicating with the base station based on the C-DRX short cycle value and the averaging window value.

36 Claims, 7 Drawing Sheets

(56) References Cited

U.S. PATENT DOCUMENTS

2018/0338332 A1* 11/2018 Lee .................... H04W 52/0216
2020/0186991 A1*  6/2020 He ........................ H04L 5/1469

FOREIGN PATENT DOCUMENTS

| CN | 110418433 A | 11/2019 |
| CN | 111315014 A |  6/2020 |

OTHER PUBLICATIONS

International Search Report and Written Opinion—PCT/CN2020/105215—ISA/EPO—Apr. 19, 2021.

* cited by examiner

METHODS AND APPARATUS FOR NEGOTIATING AVERAGING WINDOW IN LOW LATENCY COMMUNICATIONS

CROSS-REFERENCE TO RELATED APPLICATIONS

This application is a 35 U.S.C. § 371 National Phase Application of PCT Application No. PCT/CN2020/105215 filed Jul. 28, 2020, entitled "METHODS AND APPARATUS FOR NEGOTIATING AVERAGING WINDOW IN LOW LATENCY COMMUNICATIONS," which is assigned to the assignee hereof and hereby incorporated by reference herein.

BACKGROUND

Aspects of the present disclosure relate generally to wireless communications, and more particularly, to apparatuses and methods for negotiating averaging window in low latency communications.

Wireless communication networks are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which may be referred to as new radio (NR)) is envisaged to expand and support diverse usage scenarios and applications with respect to current mobile network generations. In an aspect, 5G communications technology may include: enhanced mobile broadband addressing human-centric use cases for access to multimedia content, services and data; ultra-reliable-low latency communications (URLLC) with certain specifications for latency and reliability; and massive machine type communications, which may allow a very large number of connected devices and transmission of a relatively low volume of non-delay-sensitive information. As the demand for mobile broadband access continues to increase, however, further improvements in NR communications technology and beyond may be desired.

In a wireless communication network, a user equipment (UE) may implement applications that require low latency voice communications, such as Voice over New Radio (VoNR) and/or URLLC gaming voice. When implementing such applications, the UE may operate in continuous mode discontinuous reception (C-DRX) when receiving voice data information from the base station (BS). However, the quality of service (QoS) flow associated with the voice data information may not be sufficient for the applications. Therefore, improvements in QoS flow may be desirable.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Aspects of the present disclosure include methods by a user equipment (UE) for determining a connected mode discontinuous reception (C-DRX) short cycle value, transmitting a C-DRX short cycle request to a base station, the C-DRX short cycle request including the C-DRX short cycle value, receiving a first confirmation indicating the base station accepting the C-DRX short cycle value associated with the C-DRX short cycle request, determining an averaging window value based on the C-DRX short cycle value, transmitting an averaging window request to the base station, the averaging window request including the averaging window value, receiving a second confirmation indicating the base station accepting the averaging window value associated with the averaging window request, and communicating with the base station based on the C-DRX short cycle value and the averaging window value.

Other aspects of the present disclosure include a user equipment (UE) having a memory comprising instructions, a transceiver, and one or more processors operatively coupled with the memory and the transceiver, the one or more processors configured to execute instructions in the memory to determine a connected mode discontinuous reception (C-DRX) short cycle value, transmit a C-DRX short cycle request to a base station, the C-DRX short cycle request including the C-DRX short cycle value, receive a first confirmation indicating the base station accepting the C-DRX short cycle value associated with the C-DRX short cycle request, determine an averaging window value based on the C-DRX short cycle value, transmit an averaging window request to the base station, the averaging window request including the averaging window value, receive a second confirmation indicating the base station accepting the averaging window value associated with the averaging window request, and communicate with the base station based on the C-DRX short cycle value and the averaging window value.

An aspect of the present disclosure includes a user equipment (UE) including means for determining a connected mode discontinuous reception (C-DRX) short cycle value, means for transmitting a C-DRX short cycle request to a base station, the C-DRX short cycle request including the C-DRX short cycle value, means for receiving a first confirmation indicating the base station accepting the C-DRX short cycle value associated with the C-DRX short cycle request, means for determining an averaging window value based on the C-DRX short cycle value, means for transmitting an averaging window request to the base station, the averaging window request including the averaging window value, means for receiving a second confirmation indicating the base station accepting the averaging window value associated with the averaging window request, and means for communicating with the base station based on the C-DRX short cycle value and the averaging window value.

Some aspects of the present disclosure include non-transitory computer readable media having instructions stored therein that, when executed by one or more processors of a user equipment (UE), cause the one or more processors to determine a connected mode discontinuous reception (C-DRX) short cycle value, transmit a C-DRX short cycle request to a base station, the C-DRX short cycle request including the C-DRX short cycle value, receive a first confirmation indicating the base station accepting the C-DRX short cycle value associated with the C-DRX short cycle request, determine an averaging window value based on the C-DRX short cycle value, transmit an averaging window request to the base station, the averaging window request including the averaging window value, receive a second confirmation indicating the base station accepting the averaging window value associated with the averaging window request, and communicate with the base station based on the C-DRX short cycle value and the averaging window value.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
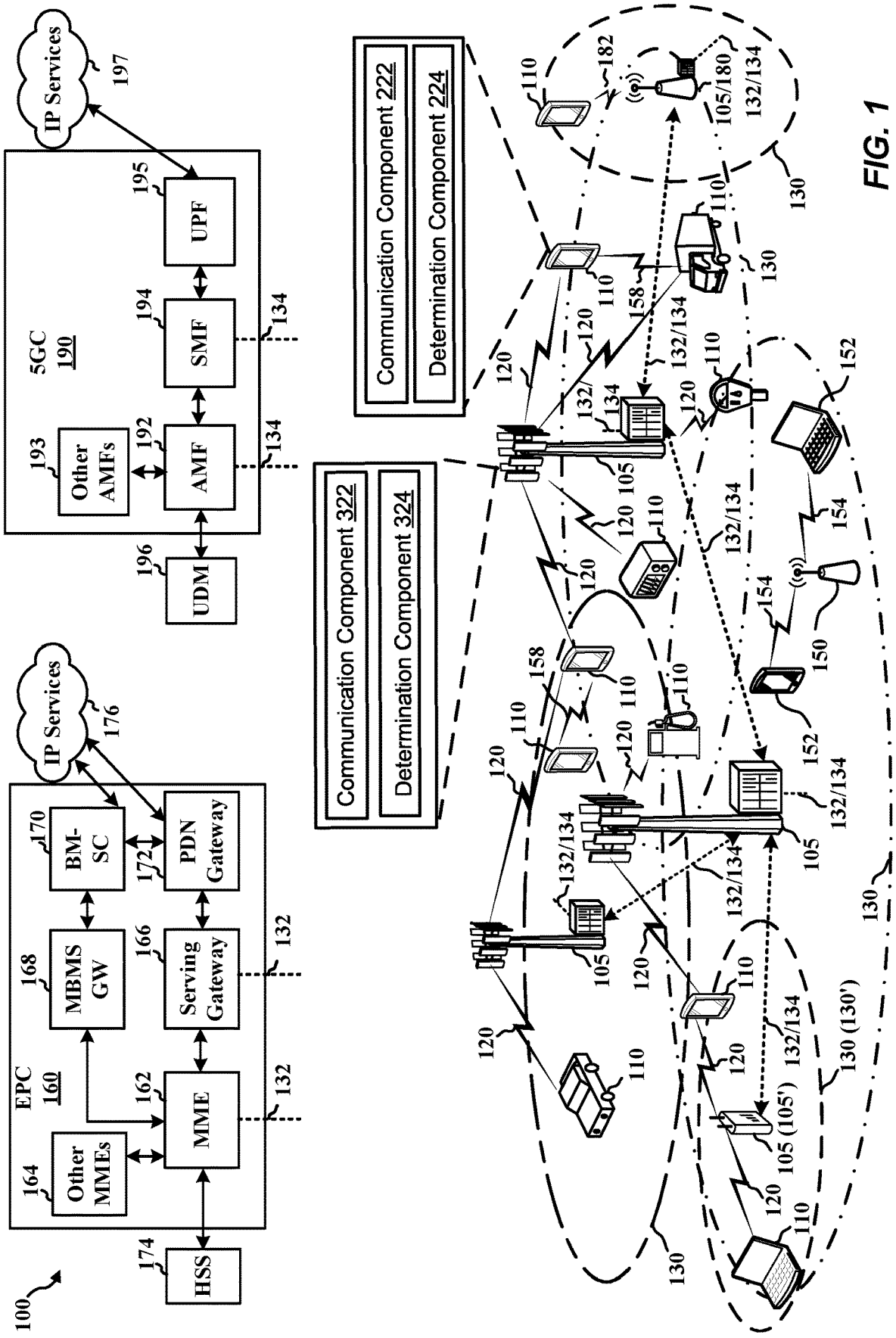
FIG. 1 is a diagram illustrating an example of a wireless communications system and an access network according to aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that may be accessed by a computer. By way of example, and not limitation, such computer-readable media may comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that may be used to store computer executable code in the form of instructions or data structures that may be accessed by a computer.

VoNR may be a feature of a network. It may be desirable for a provider to provide low latency, high quality and/or low power consumption VoNR solution to end users. Cloud gaming voice (e.g., URLLC gaming voice) may be another low latency audio use case for a network. In QoS flow model, many QoS characteristics may be relevant for improving latency and/or reliability. For low latency VoNR and URLLC gaming voice, Averaging Window may be associated with providing certain requested bit rates. This parameter may be related to the static real time network bandwidth. Accurate bandwidth estimate may help provide low latency and/or high quality VoNR and gaming voice. C-DRX short cycle may be related to conserving radio frequency (RF) power while maintaining certain QoS for VoNR and/or gaming voice. In one example, for VoNR, the C-DRX short cycle may be configured to 20 milliseconds (ms) to match audio data sample transmission rate. In some implementations, the averaging window may be related to the bandwidth static granularity for audio, video, and/or other data streams. If the date transmission throughput within the Averaging Window is sufficient for an application, the application may be able to meet its own latency and reliability conditions.

In certain instances, the QoS flow profiles may not factor NR radio access network (RAN) latency and/or base station physical bandwidth into consideration. Therefore, it may be desirable to map QoS flow profiles to RAN radio. For a RAN base station, a relevant latency and/or reliability factor may be the C-DRX short cycle. The C-DRX short cycle may be related to a period for the UE waking up and receiving data. A real time granularity may be the C-DRX short cycle. One aspect of the present disclosure includes aligning the QoS averaging window with the UE physical bandwidth granularity C-DRX short cycle. This may allow the low latency audio application sufficient run time end to end latency.

In one implementation, a UE may implement one or more applications that require low latency voice communications (e.g., latency less than 50 milliseconds (ms)). The UE may be operating in C-DRX when receiving data from the BS. The UE may negotiate the C-DRX short cycle value with the BS. For example, the UE may submit a C-DRX short cycle value request to the BS. The C-DRX short cycle value request may include a first C-DRX short cycle value, which the BS may reject. The UE may subsequently submit another C-DRX short cycle value request to the BS. The C-DRX short cycle value request may include a second C-DRX short cycle value (e.g., longer than the first C-DRX short cycle value), which the BS may accept. In response to the BS accepting the C-DRX short cycle and providing an indication of the acceptance to the UE, the UE and the BS may perform the low latency voice communications based on the second (accepted) C-DRX short cycle value. In alternative implementations, the BS may initiate the negotiation process described above.

In an aspect of the present disclosure, the UE may negotiate the averaging window value with the BS. For example, the UE may submit an averaging window value request to the BS. The averaging window value request may include a first averaging window value, which the BS may reject. The UE may subsequently submit another averaging window value request to the BS. The averaging window value request may include a second averaging window value (e.g., longer than the first averaging window value), which the BS may accept. In response, the UE and the BS may perform the low latency voice communications based on the "accepted (e.g., second averaging window value). In alternative implementations, the BS may initiate the negotiation process described above.

FIG. 1 is a diagram illustrating an example of a wireless communications system and an access network 100. The wireless communications system (also referred to as a wireless wide area network (WWAN)) includes at least one BS 105, UEs 110, an Evolved Packet Core (EPC) 160, and a 5G Core (5GC) 190. The BS 105 may include macro cells (high power cellular base station) and/or small cells (low power cellular base station). The macro cells include base stations. The small cells include femtocells, picocells, and microcells. In one implementation, the UE 110 may include a communication component 222 configured to communicate with the BS 105 via a cellular network, a Wi-Fi network, or other wireless and/or wired networks. The UE 110 may include a determination component 224 configured to determine averaging window values and/or C-DRX short cycle values. In some implementations, The communication component 222 and the determination component 224 may be implemented using hardware, software, or a combination of hardware and software. In some implementations, the BS 105 may include a communication component 322 configured to communicate with the UE 110. The BS 105 may include a determination component 324 configured to determine averaging window values and/or C-DRX short cycle values. In some implementations, The communication component 322 and the determination component 324 may be implemented using hardware, software, or a combination of hardware and software.

A BS 105 configured for 4G Long-Term Evolution (LTE) (collectively referred to as Evolved Universal Mobile Telecommunications System (UMTS) Terrestrial Radio Access Network (E-UTRAN)) may interface with the EPC 160 through backhaul links interfaces 132 (e.g., S1, X2, Internet Protocol (IP), or flex interfaces). A BS 105 configured for 5G NR (collectively referred to as Next Generation RAN (NG-RAN)) may interface with 5GC 190 through backhaul links interfaces 134 (e.g., S1, X2, Internet Protocol (IP), or flex interface). In addition to other functions, the BS 105 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The BS 105 may communicate directly or indirectly (e.g., through the EPC 160 or 5GC 190) with each other over the backhaul links interfaces 134. The backhaul links 132, 134 may be wired or wireless.

The BS 105 may wirelessly communicate with the UEs 110. Each of the BS 105 may provide communication coverage for a respective geographic coverage area 130. There may be overlapping geographic coverage areas 130. For example, the small cell 105' may have a coverage area 130' that overlaps the coverage area 130 of one or more macro BS 105. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the BS 105 and the UEs 110 may include uplink (UL) (also referred to as reverse link) transmissions from a UE 110 to a BS 105 and/or downlink (DL) (also referred to as forward link) transmissions from a BS 105 to a UE 110. The communication links 120 may use multiple-input and multiple-output (MIMO) antenna technology, including spatial multiplexing, beamforming, and/or transmit diversity. The communication links may be through one or more carriers. The BS 105/UEs 110 may use spectrum up to Y MHz (e.g., 5, 10, 15, 20, 100, 400, etc. MHz) bandwidth per carrier allocated in a carrier aggregation of up to a total of $Y_x$ MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 110 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 105' may operate in a licensed and/or an unlicensed frequency spectrum. When operating in an unlicensed frequency spectrum, the small cell 105' may employ NR and use the same 5 GHz unlicensed frequency spectrum as used by the Wi-Fi AP 150. The small cell 105', employing NR in an unlicensed frequency spectrum, may boost coverage to and/or increase capacity of the access network.

A BS 105, whether a small cell 105' or a large cell (e.g., macro base station), may include an eNB, gNodeB (gNB), or other type of base station. Some base stations, such as gNB 180 may operate in one or more frequency bands within the electromagnetic spectrum. The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" (mmW) band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band. Communications using the mmW/near mmW radio frequency band has extremely high path loss and a short range. The mmW base station 180 may utilize beamforming 182 with the UE 110 to compensate for the path loss and short range.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 110 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a packet switched (PS) Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the BS 105 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 110 and the 5GC 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The BS 105 may also be referred to as a gNB, Node B, evolved Node B (eNB), an access point, a base transceiver station, a radio base station, an access point, an access node, a radio transceiver, a NodeB, eNodeB (eNB), gNB, Home NodeB, a Home eNodeB, a relay, a transceiver function, a basic service set (BSS), an extended service set (ESS), a transmit reception point (TRP), or some other suitable terminology. The BS 105 provides an access point to the EPC 160 or 5GC 190 for a UE 110. Examples of UEs 110 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 110 may be referred to as IoT devices (e.g., parking meter, gas pump, toaster, vehicles, heart monitor, etc.). The UE 110 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
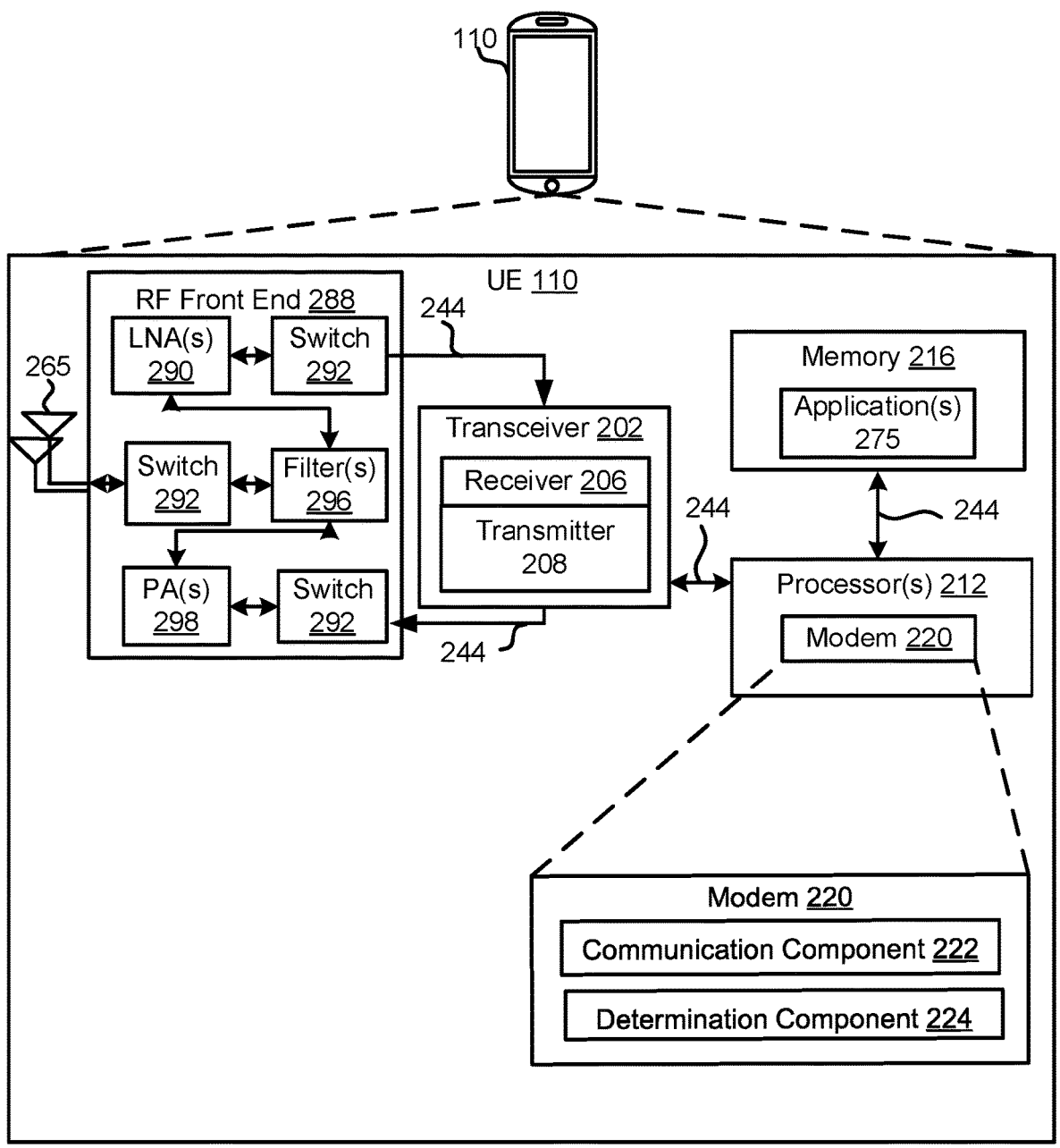
FIG. 2 is a schematic diagram of an example of a user equipment according to aspects of the present disclosure.

Referring to FIG. 2, one example of an implementation of the UE 110 may include a modem 220 having The communication component 222 and the determination component 224. In one implementation, the UE 110 may include a communication component 222 configured to communicate with the BS 105 via a cellular network, a Wi-Fi network, or other wireless and wired networks. The UE 110 may include a determination component 224 configured to determine averaging window values and/or C-DRX short cycle values.

In some implementations, the UE 110 may include a variety of components, including components such as one or more processors 212 and memory 216 and transceiver 202 in communication via one or more buses 244, which may operate in conjunction with the modem 220 and the communication component 222 to enable one or more of the functions described herein related to communicating with the BS 105. Further, the one or more processors 212, modem 220, memory 216, transceiver 202, RF front end 288 and one or more antennas 265, may be configured to support voice and/or data calls (simultaneously or non-simultaneously) in one or more radio access technologies. The one or more antennas 265 may include one or more antennas, antenna elements and/or antenna arrays.

In an aspect, the one or more processors 212 may include the modem 220 that uses one or more modem processors. The various functions related to The communication component 222 and the determination component 224 may be included in the modem 220 and/or processors 212 and, in an aspect, may be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiving device processor, or a transceiver processor associated with transceiver 202. Additionally, the modem 220 may configure the UE 110 along with the processors 212. In other aspects, some of the features of the one or more processors 212 and/or the modem 220 associated with the communication component 222 may be performed by transceiver 202.

The memory 216 may be configured to store data used and/or local versions of application 275. Also, the memory 216 may be configured to store data used herein and/or local versions of The communication component 222 and the determination component 224, and/or one or more of the subcomponents being executed by at least one processor 212. Memory 216 may include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining The communication component 222 and the determination component 224, and/or one or more of the subcomponents, and/or data associated therewith, when UE 110 is operating at least one processor 212 to execute The communication component 222 and the determination component 224, and/or one or more of the subcomponents.

Transceiver 202 may include at least one receiver 206 and at least one transmitter 208. Receiver 206 may include hardware, firmware, and/or software code executable by a processor for receiving data, the code comprising instructions and being stored in a memory (e.g., computer-readable medium). Receiver 206 may be, for example, a RF receiving device. In an aspect, the receiver 206 may receive signals transmitted by at least one BS 105. Transmitter 208 may include hardware, firmware, and/or software code executable by a processor for transmitting data, the code comprising instructions and being stored in a memory (e.g., computer-readable medium). A suitable example of transmitter 208 may including, but is not limited to, an RF transmitter.

Moreover, in an aspect, UE 110 may include RF front end 288, which may operate in communication with one or more antennas 265 and transceiver 202 for receiving and transmitting radio transmissions, for example, wireless communications transmitted by at least one BS 105 or wireless transmissions transmitted by UE 110. RF front end 288 may be coupled with one or more antennas 265 and may include one or more low-noise amplifiers (LNAs) 290, one or more switches 292, one or more power amplifiers (PAs) 298, and one or more filters 296 for transmitting and receiving RF signals.

In an aspect, LNA 290 may amplify a received signal at a desired output level. In an aspect, each LNA 290 may have a specified minimum and maximum gain values. In an aspect, RF front end 288 may use one or more switches 292 to select a particular LNA 290 and the specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and the specified gain value based on a desired gain value for a particular application.

Also, for example, one or more filters 296 may be used by RF front end 288 to filter a received signal to obtain an input RF signal. Similarly, in an aspect, for example, a respective filter 296 may be used to filter an output from a respective PA 298 to produce an output signal for transmission. In an aspect, each filter 296 may be coupled with a specific LNA 290 and/or PA 298. In an aspect, RF front end 288 may use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that UE 110 may communicate with, for example, one or more BS 105 or one or more cells associated with one or more BS 105. In an aspect, for example, the modem 220 may configure transceiver 202 to operate at a specified frequency and power level based on the UE configuration of the UE 110 and the communication protocol used by the modem 220.

In an aspect, the modem 220 may be a multiband-multimode modem, which may process digital data and communicate with transceiver 202 such that the digital data is sent and received using transceiver 202. In an aspect, the modem 220 may be multiband and be configured to support multiple frequency bands for a specific communications protocol. In an aspect, the modem 220 may be multimode and be configured to support multiple operating networks and communications protocols. In an aspect, the modem 220 may control one or more components of UE 110 (e.g., RF front end 288, transceiver 202) to enable transmission and/or reception of signals from the network based on a specified modem configuration. In an aspect, the modem configuration may be based on the mode of the modem and the frequency band in use. In another aspect, the modem configuration may be based on UE configuration information associated with UE 110 as provided by the network.

Figure 3:
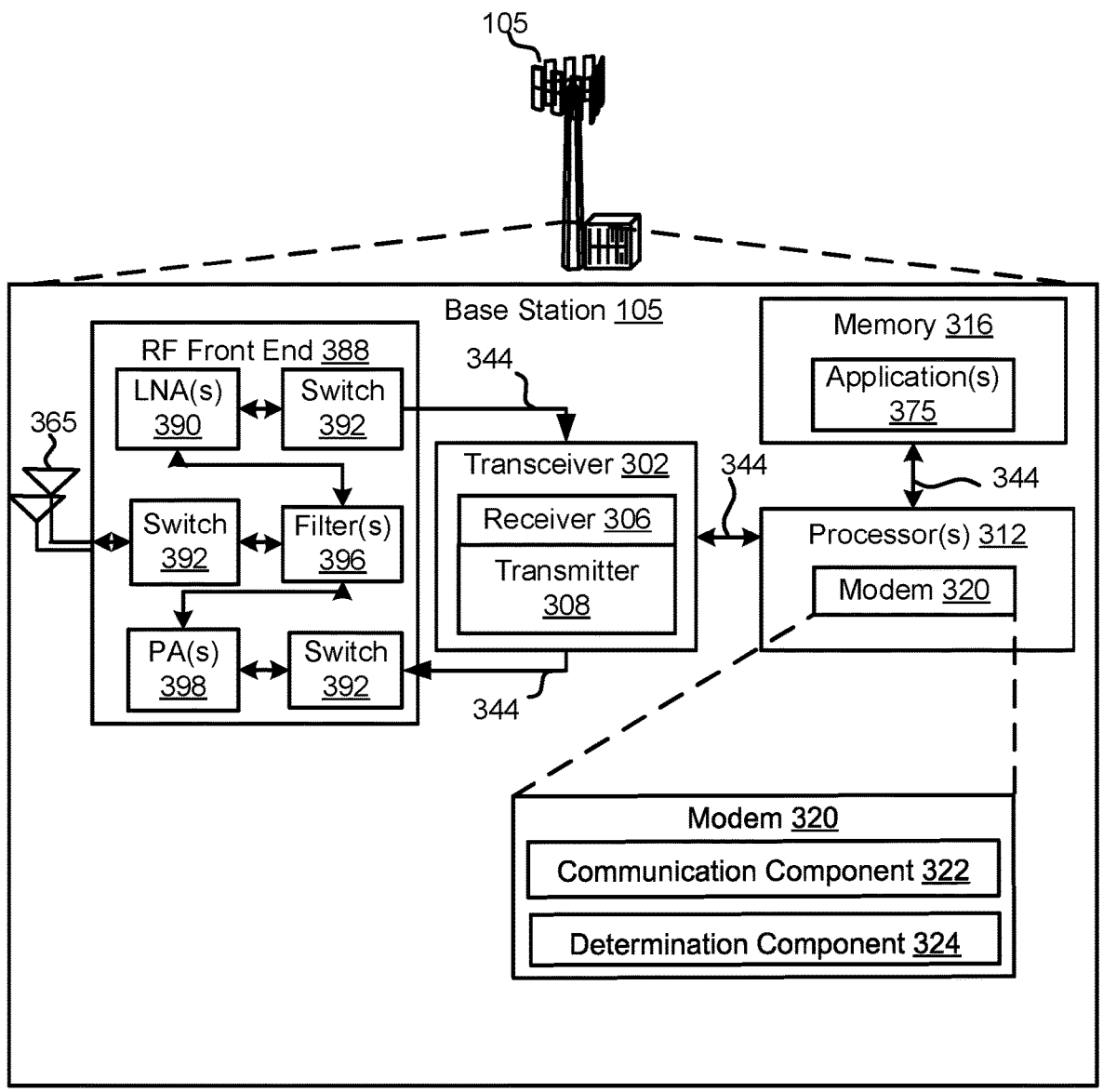
FIG. 3 is a schematic diagram of an example of a base station according to aspects of the present disclosure.

Referring to FIG. 3, one example of an implementation of the BS 105 may include a modem 320 having The communication component 322 and the determination component 324. In some implementations, the BS 105 may include a communication component 322 configured to communicate with the UE 110. The BS 105 may include a determination component 324 configured to determine averaging window values and/or C-DRX short cycle values.

In some implementations, the BS 105 may include a variety of components, including components such as one or more processors 312 and memory 316 and transceiver 302 in communication via one or more buses 344, which may operate in conjunction with the modem 320 and the communication component 322 to enable one or more of the functions described herein related to communicating with the UE 110. Further, the one or more processors 312, modem 320, memory 316, transceiver 302, RF front end 388 and one or more antennas 365, may be configured to support voice and/or data calls (simultaneously or non-simultaneously) in one or more radio access technologies.

In an aspect, the one or more processors 312 may include the modem 320 that uses one or more modem processors. The various functions related to The communication component 322 and the determination component 324 may be included in the modem 320 and/or processors 312 and, in an aspect, may be executed by a single processor, while in other aspects, different ones of the functions may be executed by a combination of two or more different processors. For example, in an aspect, the one or more processors 312 may include any one or any combination of a modem processor, or a baseband processor, or a digital signal processor, or a transmit processor, or a receiving device processor, or a transceiver processor associated with transceiver 302. Additionally, the modem 320 may configure the BS 105 and processors 312. In other aspects, some of the features of the one or more processors 312 and/or the modem 320 associated with the communication component 322 may be performed by transceiver 302.

The memory 316 may be configured to store data used herein and/or local versions of applications 375. Also, the memory 316 may be configured to store data used herein and/or local versions of The communication component 322 and the determination component 324, and/or one or more of the subcomponents being executed by at least one processor 312. Memory 316 may include any type of computer-readable medium usable by a computer or at least one processor 312, such as random access memory (RAM), read only memory (ROM), tapes, magnetic discs, optical discs, volatile memory, non-volatile memory, and any combination thereof. In an aspect, for example, memory 316 may be a non-transitory computer-readable storage medium that stores one or more computer-executable codes defining The communication component 322 and the determination component 324, and/or one or more of the subcomponents, and/or data associated therewith, when the BS 105 is operating at least one processor 312 to execute The communication component 322 and the determination component 324, and/or one or more of the subcomponents.

Transceiver 302 may include at least one receiver 306 and at least one transmitter 308. The at least one receiver 306 may include hardware, firmware, and/or software code executable by a processor for receiving data, the code comprising instructions and being stored in a memory (e.g., computer-readable medium). The receiver 306 may be, for example, a RF receiving device. In an aspect, receiver 306 may receive signals transmitted by the UE 110. Transmitter 308 may include hardware, firmware, and/or software code executable by a processor for transmitting data, the code comprising instructions and being stored in a memory (e.g., computer-readable medium). A suitable example of transmitter 308 may including, but is not limited to, an RF transmitter.

Moreover, in an aspect, the BS 105 may include RF front end 388, which may operate in communication with one or more antennas 365 and transceiver 302 for receiving and transmitting radio transmissions, for example, wireless communications transmitted by other BS 105 or wireless transmissions transmitted by UE 110. RF front end 388 may be coupled with one or more antennas 365 and may include one or more low-noise amplifiers (LNAs) 390, one or more switches 392, one or more power amplifiers (PAs) 398, and one or more filters 396 for transmitting and receiving RF signals.

In an aspect, LNA 390 may amplify a received signal at a desired output level. In an aspect, each LNA 390 may have a specified minimum and maximum gain values. In an aspect, RF front end 388 may use one or more switches 392 to select a particular LNA 390 and the specified gain value based on a desired gain value for a particular application.

Further, for example, one or more PA(s) 398 may be used by RF front end 388 to amplify a signal for an RF output at a desired output power level. In an aspect, each PA 398 may have specified minimum and maximum gain values. In an aspect, RF front end 388 may use one or more switches 392 to select a particular PA 398 and the specified gain value based on a desired gain value for a particular application.

Also, for example, one or more filters 396 may be used by RF front end 388 to filter a received signal to obtain an input RF signal. Similarly, in an aspect, for example, a respective filter 396 may be used to filter an output from a respective PA 398 to produce an output signal for transmission. In an aspect, each filter 396 may be coupled with a specific LNA 390 and/or PA 398. In an aspect, RF front end 388 may use one or more switches 392 to select a transmit or receive path using a specified filter 396, LNA 390, and/or PA 398, based on a configuration as specified by transceiver 302 and/or processor 312.

As such, transceiver 302 may be configured to transmit and receive wireless signals through one or more antennas 365 via RF front end 388. In an aspect, transceiver may be tuned to operate at specified frequencies such that BS 105 may communicate with, for example, the UE 110 or one or more cells associated with one or more BS 105. In an aspect, for example, the modem 320 may configure transceiver 302 to operate at a specified frequency and power level based on the base station configuration of the BS 105 and the communication protocol used by the modem 320.

In an aspect, the modem 320 may be a multiband-multimode modem, which may process digital data and communicate with transceiver 302 such that the digital data is sent and received using transceiver 302. In an aspect, the modem 320 may be multiband and be configured to support multiple frequency bands for a specific communications protocol. In an aspect, the modem 320 may be multimode and be configured to support multiple operating networks and communications protocols. In an aspect, the modem 320 may control one or more components of the BS 105 (e.g., RF front end 388, transceiver 302) to enable transmission and/or reception of signals from the network based on a specified modem configuration. In an aspect, the modem configuration may be based on the mode of the modem and the frequency band in use. In another aspect, the modem configuration may be based on base station configuration associated with the BS 105.

Figure 4:
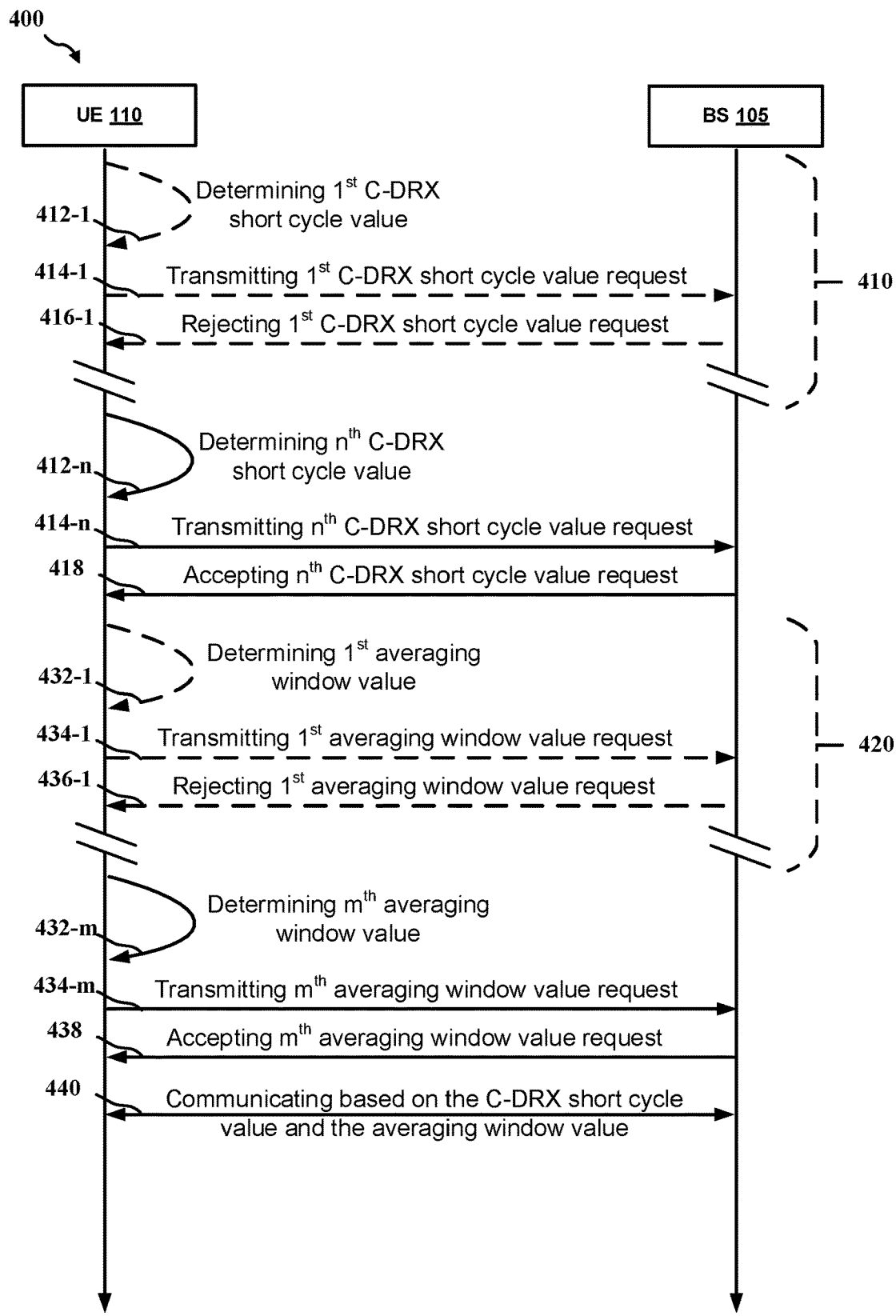
FIG. 4 illustrates an example of process flow diagram indicating the negotiation of averaging window values between a user equipment and a base station according to aspects of the present disclosure according to aspects of the present disclosure.

FIG. 4 illustrates an example of a process flow diagram indicating the negotiation of averaging window values between a user equipment and a base station. In some implementations, at 410, the UE 110 and the BS 105 may optionally negotiate a C-DRX short cycle value. For example, at 412-1 the determination component 224 of the UE 110 may optionally determine a first C-DRX short cycle value. At 414-1, the communication component 222 of the UE 110 may optionally transmit a first C-DRX short cycle value request, which may include or indicate the first C-DRX short cycle value, to the BS 105. At 416-1, the BS 105 may optionally reject the first C-DRX short cycle value request. The optional negotiation may include the UE 110 and the BS 105 repeating the processes above more than once. During the negotiation, the UE 110 may attempt to request for a lowest possible C-DRX short cycle value that the BS 105 may accept. For example, the first C-DRX short cycle value may be 10 ms. After the BS 105 rejects the first C-DRX short cycle value, the UE 110 may propose a second C-DRX short cycle value (that is longer than the first C-DRX short cycle value) of 20 ms. The UE 110 may determine the C-DRX short cycle value based on anticipated latency or bandwidth.

After the optional negotiation, in some aspects of the present disclosure, at 412-n the determination component 224 of the UE 110 may determine an n-th C-DRX short cycle value. At 414-n, the communication component 222 of the UE 110 may transmit an n-th C-DRX short cycle value request, which may include or indicate the n-th C-DRX short cycle value, to the BS 105. At 418, the BS 105 may accept the n-th C-DRX short cycle value request. The value of n may be any integer greater than 0. For n equaling to 1, the UE 110 and the BS 105 may bypass the negotiation process at 410.

In some aspects, at 420, the UE 110 and the BS 105 may optionally negotiate an averaging window value. For example, at 432-1 the determination component 224 of the UE 110 may optionally determine a first averaging window value. In one implementation, the averaging window value may be a product of a latency factor and the C-DRX short cycle. For example, a C-DRX short cycle of 20 ms and a latency factor of 3 may indicate an averaging window value of 60 ms. At 434-1, the communication component 222 of the UE 110 may optionally transmit a first averaging window value request, which may include or indicate the first averaging window value, to the BS 105. At 436-1, the BS 105 may optionally reject the first averaging window value request. The optional negotiation may include the UE 110 and the BS 105 repeating the processes above more than once. During the negotiation, the UE 110 may attempt to request for a lowest possible averaging window value that the BS 105 may accept. For example, the first averaging window value may be 60 ms. After the BS 105 rejects the first averaging window value, the UE 110 may propose a second averaging window value (that is longer than the first averaging window value) of 120 ms. The UE 110 may determine the averaging window value based on anticipated latency or bandwidth.

After the optional negotiation, in some aspects of the present disclosure, at 432-m the determination component 224 of the UE 110 may determine an m-th averaging window value. At 434-m, the communication component 222 of the UE 110 may transmit an m-th averaging window value request, which may include or indicate the m-th averaging window value, to the BS 105. At 438, the BS 105 may accept the m-th averaging window value request. The value of m may be any integer greater than 0. For m equaling to 1, the UE 110 and the BS 105 may bypass the negotiation process at 430.

At 440, the UE 110 and the BS 105 may communicate using the C-DRX short cycle value and/or the averaging window value determined above. In some aspects, the UE 110 and the BS 105 may communicate low latency QoS flow for one or more applications utilizing VoNR and/or gaming voice (e.g., cloud gaming). Examples of the C-DRX short cycle value may be 1 ms, 2 ms, 5 ms, 10 ms, 20 ms, 50 ms, or higher. Examples of the averaging window value may be 1 ms, 2 ms, 5 ms, 10 ms, 20 ms, 50 ms, 100 ms, 200 ms, 500 ms, or higher.

Figure 5:
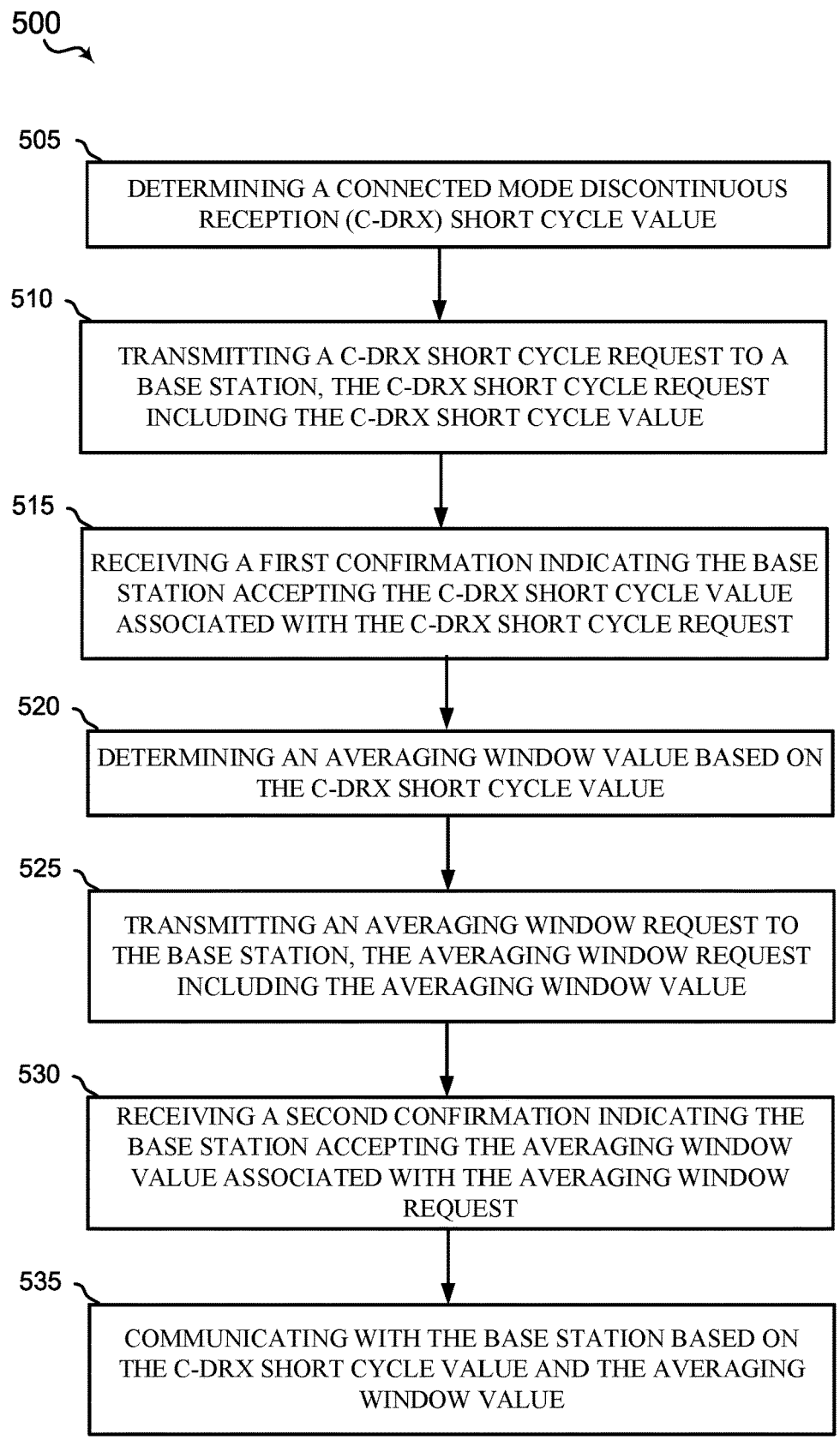
FIG. 5 illustrates an example of a method for determining the averaging window value by the UE according to aspects of the present disclosure.

FIG. 5 illustrates an example of a method for determining the averaging window value. For example, a method 500 may be performed by the one or more of the processor 212, the memory 216, the applications 275, the modem 220, the transceiver 202, the receiver 206, the transmitter 208, the RF front end 288, the communication component 222, the determination component 224, and/or one or more other components of the UE 110 in the wireless communication network 100. In alternative implementations, the method 500 may be performed by BS 105 and or the components of the BS 105.

At block 505, the method 500 may determine a connected mode discontinuous reception (C-DRX) short cycle value. For example, the determination component 224, the processor 212, the memory 216, the modem 220, and/or the applications 275 of the UE 110 may determine a connected mode discontinuous reception (C-DRX) short cycle value as described above.

In certain implementations, the determination component 224, the processor 212, the memory 216, the modem 220, and/or the applications 275 may be configured to and/or may define means for determining a connected mode discontinuous reception (C-DRX) short cycle value.

At block 510, the method 500 may transmit a C-DRX short cycle request to a base station, the C-DRX short cycle request including the C-DRX short cycle value. For example, the communication component 222, the transceiver 202, the receiver 206, the transmitter 208, the RF front end 288, the subcomponents of the RF front end 288, the processor 212, the memory 216, the modem 220, and/or the applications 275 of the UE 110 may transmit a C-DRX short cycle request to a base station, the C-DRX short cycle request including the C-DRX short cycle value as described above. The communication component 222 may send the digital signals to the transceiver 202 or the transmitter 204. The transceiver 202 or the transmitter 204 may convert the digital signals to electrical signals and send to the RF front end 288. The RF front end 288 may filter and/or amplify the electrical signals. The RF front end 288 may send the electrical signals as electro-magnetic signals via the one or more antennas 265.

In certain implementations, the communication component 222, the transceiver 202, the receiver 206, the transmitter 208, the RF front end 288, the subcomponents of the RF front end 288, the processor 212, the memory 216, the modem 220, and/or the applications 275 may be configured to and/or may define means for transmitting a C-DRX short cycle request to a base station, the C-DRX short cycle request including the C-DRX short cycle value.

At block 515, the method 500 may receive a first confirmation indicating the base station accepting the C-DRX short cycle value associated with the C-DRX short cycle request. For example, the communication component 222, the transceiver 202, the receiver 206, the transmitter 208, the RF front end 288, the subcomponents of the RF front end 288, the processor 212, the memory 216, the modem 220, and/or the applications 275 of the UE 110 may receive a first confirmation indicating the base station accepting the C-DRX short cycle value associated with the C-DRX short cycle request. The RF front end 288 may receive the electrical signals converted from electro-magnetic signals. The RF front end 288 may filter and/or amplify the electrical signals. The transceiver 202 or the receiver 206 may convert the electrical signals to digital signals, and send the digital signals to the communication component 222.

In certain implementations, the communication component 222, the transceiver 202, the receiver 206, the transmitter 208, the RF front end 288, the subcomponents of the RF front end 288, the processor 212, the memory 216, the modem 220, and/or the applications 275 may be configured to and/or may define means for receiving a first confirmation indicating the base station accepting the C-DRX short cycle value associated with the C-DRX short cycle request.

At block 520, the method 500 may determine an averaging window value based on the C-DRX short cycle value. For example, the determination component 224, the processor 212, the memory 216, the modem 220, and/or the applications 275 of the UE 110 may determine an averaging window value based on the C-DRX short cycle value as described above.

In certain implementations, the determination component 224, the processor 212, the memory 216, the modem 220, and/or the applications 275 may be configured to and/or may define means for determining an averaging window value based on the C-DRX short cycle value.

At block 525, the method 500 may transmit an averaging window request to the base station, the averaging window request including the averaging window value. For example, the communication component 222, the transceiver 202, the receiver 206, the transmitter 208, the RF front end 288, the subcomponents of the RF front end 288, the processor 212, the memory 216, the modem 220, and/or the applications 275 of the UE 110 may transmit an averaging window request to the base station, the averaging window request including the averaging window value as described above. The communication component 222 may send the digital signals to the transceiver 202 or the transmitter 204. The transceiver 202 or the transmitter 204 may convert the digital signals to electrical signals and send to the RF front end 288. The RF front end 288 may filter and/or amplify the electrical signals. The RF front end 288 may send the electrical signals as electro-magnetic signals via the one or more antennas 265.

In certain implementations, the communication component 222, the transceiver 202, the receiver 206, the transmitter 208, the RF front end 288, the subcomponents of the RF front end 288, the processor 212, the memory 216, the modem 220, and/or the applications 275 may be configured to and/or may define means for transmitting an averaging window request to the base station, the averaging window request including the averaging window value.

At block 530, the method 500 may receive a second confirmation indicating the base station accepting the averaging window value associated with the averaging window request. For example, the communication component 222, the transceiver 202, the receiver 206, the transmitter 208, the RF front end 288, the subcomponents of the RF front end 288, the processor 212, the memory 216, the modem 220, and/or the applications 275 of the UE 110 may receive a second confirmation indicating the base station accepting the averaging window value associated with the averaging window request. The RF front end 288 may receive the electrical signals converted from electro-magnetic signals. The RF front end 288 may filter and/or amplify the electrical signals. The transceiver 202 or the receiver 206 may convert the electrical signals to digital signals, and send the digital signals to the communication component 222.

In certain implementations, the communication component 222, the transceiver 202, the receiver 206, the transmitter 208, the RF front end 288, the subcomponents of the RF front end 288, the processor 212, the memory 216, the modem 220, and/or the applications 275 may be configured to and/or may define means for receiving a second confirmation indicating the base station accepting the averaging window value associated with the averaging window request.

At block 535, the method 500 may communicate with the base station based on the C-DRX short cycle value and the averaging window value. For example, the communication component 222, the transceiver 202, the receiver 206, the transmitter 208, the RF front end 288, the subcomponents of the RF front end 288, the processor 212, the memory 216, the modem 220, and/or the applications 275 of the UE 110 may communicate with the base station based on the C-DRX short cycle value and the averaging window value. The RF front end 288 may receive the electrical signals converted from electro-magnetic signals. The RF front end 288 may filter and/or amplify the electrical signals. The transceiver 202 or the receiver 206 may convert the electrical signals to digital signals, and send the digital signals to the communication component 222. Alternatively or additionally, the communication component 222 may send the digital signals to the transceiver 202 or the transmitter 204. The transceiver 202 or the transmitter 204 may convert the digital signals to electrical signals and send to the RF front end 288. The RF front end 288 may filter and/or amplify the electrical signals. The RF front end 288 may send the electrical signals as electro-magnetic signals via the one or more antennas 265.

In certain implementations, the communication component 222, the transceiver 202, the receiver 206, the transmitter 208, the RF front end 288, the subcomponents of the RF front end 288, the processor 212, the memory 216, the modem 220, and/or the applications 275 may be configured to and/or may define means for communicating with the base station based on the C-DRX short cycle value and the averaging window value.

Alternatively or additionally, the method 500 may further include any of the methods above, wherein determining the C-DRX short cycle value comprises determining the C-DRX shorty cycle value based on at least one of a voice over New Radio (VoNR) latency request, a gaming voice latency request, or a voice real-time sample rate.

Alternatively or additionally, the method 500 may further include any of the methods above, wherein determining the averaging window value comprises determining the averaging window value by multiplying the C-DRX short cycle value by a latency factor.

Alternatively or additionally, the method 500 may further include any of the methods above, further comprising, prior to determining the averaging window value determining a previous averaging window value, transmitting a previous averaging window request to the base station, the previous averaging window request including the previous averaging window value, and receiving a rejection indicating the base station rejecting the previous averaging window value associated with the previous averaging window request.

Alternatively or additionally, the method 500 may further include any of the methods above, wherein determining the averaging window value comprises determining the averaging window value by incrementing the previous averaging window value.

Alternatively or additionally, the method 500 may further include any of the methods above, wherein the previous averaging window value is a first integer multiple of the C-DRX shorty cycle value, and the averaging window value is a second integer multiple of the pervious averaging window value.

Alternatively or additionally, the method 500 may further include any of the methods above, wherein the averaging window value is twice the previous averaging window value.

Alternatively or additionally, the method 500 may further include any of the methods above, wherein the C-DRX shorty cycle value is between 1 and 50 milliseconds, and the averaging window value is between 1 and 500 milliseconds.

Alternatively or additionally, the method 500 may further include any of the methods above, wherein communicating with the base station comprises transmitting or receiving data associated with voice over New Radio (VoNR) or ultra-reliable low-latency communication gaming voice.

Figure 6:
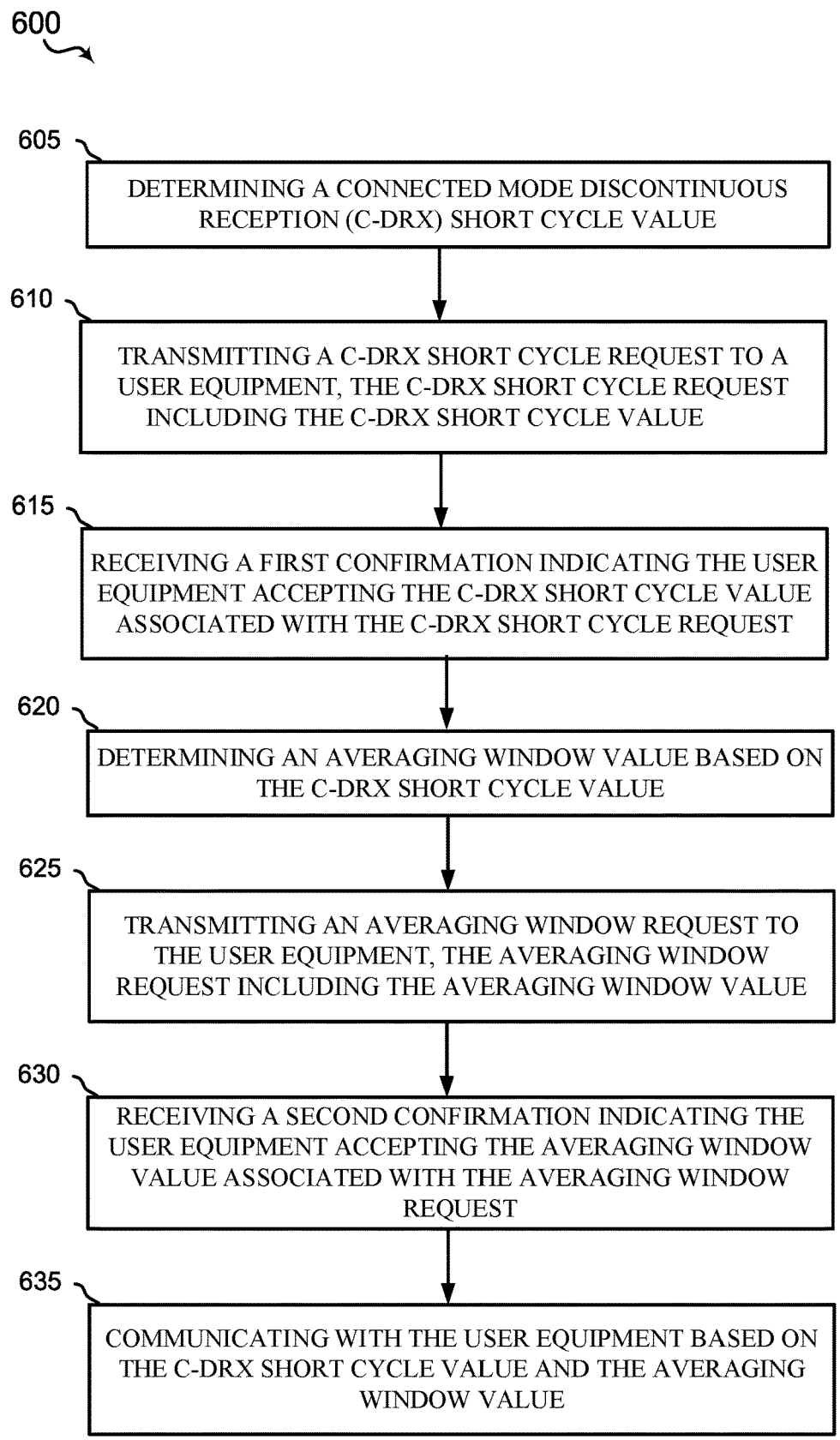
FIG. 6 illustrates an example of a method for determining the averaging window value by the BS according to aspects of the present disclosure.

FIG. 6 illustrates an example of a method for determining the averaging window value by the BS. For example, a method 600 may be performed by the one or more of the processor 312, the memory 316, the applications 375, the modem 320, the transceiver 302, the receiver 306, the transmitter 308, the RF front end 388, the communication component 322, the determination component 324, and/or one or more other components of the BS 105 in the wireless communication network 100.

At block 605, the method 600 may determine a connected mode discontinuous reception (C-DRX) short cycle value. For example, the determination component 324, the processor 312, the memory 316, the modem 320, and/or the applications 375 of the BS 105 may determine a connected mode discontinuous reception (C-DRX) short cycle value as described above.

In certain implementations, the determination component 324, the processor 312, the memory 316, the modem 320, and/or the applications 375 may be configured to and/or may define means for determining a connected mode discontinuous reception (C-DRX) short cycle value.

At block 610, the method 600 may transmit a C-DRX short cycle request to a user equipment, the C-DRX short cycle request including the C-DRX short cycle value. For example, the communication component 322, the transceiver 302, the receiver 306, the transmitter 308, the RF front end 388, the subcomponents of the RF front end 388, the processor 312, the memory 316, the modem 320, and/or the applications 375 of the BS 105 may transmit a C-DRX short cycle request to a user equipment, the C-DRX short cycle request including the C-DRX short cycle value as described above. The communication component 322 may send the digital signals to the transceiver 302 or the transmitter 304. The transceiver 302 or the transmitter 304 may convert the digital signals to electrical signals and send to the RF front end 388. The RF front end 388 may filter and/or amplify the electrical signals. The RF front end 388 may send the electrical signals as electro-magnetic signals via the one or more antennas 365.

In certain implementations, the communication component 322, the transceiver 302, the receiver 306, the transmitter 308, the RF front end 388, the subcomponents of the RF front end 388, the processor 312, the memory 316, the modem 320, and/or the applications 375 may be configured to and/or may define means for transmitting a C-DRX short cycle request to a user equipment, the C-DRX short cycle request including the C-DRX short cycle value.

At block 615, the method 600 may receive a first confirmation indicating the user equipment accepting the C-DRX short cycle value associated with the C-DRX short cycle request. For example, the communication component 322, the transceiver 302, the receiver 306, the transmitter 308, the RF front end 388, the subcomponents of the RF front end 388, the processor 312, the memory 316, the modem 320, and/or the applications 375 of the BS 105 may receive a first confirmation indicating the user equipment accepting the C-DRX short cycle value associated with the C-DRX short cycle request. The RF front end 388 may receive the electrical signals converted from electro-magnetic signals. The RF front end 388 may filter and/or amplify the electrical signals. The transceiver 302 or the receiver 306 may convert the electrical signals to digital signals, and send the digital signals to the communication component 322.

In certain implementations, the communication component 322, the transceiver 302, the receiver 306, the transmitter 308, the RF front end 388, the subcomponents of the RF front end 388, the processor 312, the memory 316, the modem 320, and/or the applications 375 may be configured to and/or may define means for receiving a first confirmation indicating the user equipment accepting the C-DRX short cycle value associated with the C-DRX short cycle request.

At block 620, the method 600 may determine an averaging window value based on the C-DRX short cycle value. For example, the determination component 324, the processor 312, the memory 316, the modem 320, and/or the applications 375 of the BS 105 may determine an averaging window value based on the C-DRX short cycle value as described above.

In certain implementations, the determination component 324, the processor 312, the memory 316, the modem 320, and/or the applications 375 may be configured to and/or may define means for determining an averaging window value based on the C-DRX short cycle value.

At block 625, the method 600 may transmit an averaging window request to the user equipment, the averaging window request including the averaging window value. For example, the communication component 322, the transceiver 302, the receiver 306, the transmitter 308, the RF front end 388, the subcomponents of the RF front end 388, the processor 312, the memory 316, the modem 320, and/or the applications 375 of the BS 105 may transmit an averaging window request to the user equipment, the averaging window request including the averaging window value as described above. The communication component 322 may send the digital signals to the transceiver 302 or the transmitter 304. The transceiver 302 or the transmitter 304 may convert the digital signals to electrical signals and send to the RF front end 388. The RF front end 388 may filter and/or amplify the electrical signals. The RF front end 388 may send the electrical signals as electro-magnetic signals via the one or more antennas 365.

In certain implementations, the communication component 322, the transceiver 302, the receiver 306, the transmitter 308, the RF front end 388, the subcomponents of the RF front end 388, the processor 312, the memory 316, the modem 320, and/or the applications 375 may be configured to and/or may define means for transmitting an averaging window request to the user equipment, the averaging window request including the averaging window value.

At block 630, the method 600 may receive a second confirmation indicating the user equipment accepting the averaging window value associated with the averaging window request. For example, the communication component 322, the transceiver 302, the receiver 306, the transmitter 308, the RF front end 388, the subcomponents of the RF front end 388, the processor 312, the memory 316, the modem 320, and/or the applications 375 of the BS 105 may receive a second confirmation indicating the user equipment accepting the averaging window value associated with the averaging window request. The RF front end 388 may receive the electrical signals converted from electro-magnetic signals. The RF front end 388 may filter and/or amplify the electrical signals. The transceiver 302 or the receiver 306 may convert the electrical signals to digital signals, and send the digital signals to the communication component 322.

In certain implementations, the communication component 322, the transceiver 302, the receiver 306, the transmitter 308, the RF front end 388, the subcomponents of the RF front end 388, the processor 312, the memory 316, the modem 320, and/or the applications 375 may be configured to and/or may define means for receiving a second confirmation indicating the user equipment accepting the averaging window value associated with the averaging window request.

At block 635, the method 600 may communicate with the user equipment based on the C-DRX short cycle value and the averaging window value. For example, the communication component 322, the transceiver 302, the receiver 306, the transmitter 308, the RF front end 388, the subcomponents of the RF front end 388, the processor 312, the memory 316, the modem 320, and/or the applications 375 of the BS 105 may communicate with the user equipment based on the C-DRX short cycle value and the averaging window value. The RF front end 388 may receive the electrical signals converted from electro-magnetic signals. The RF front end 388 may filter and/or amplify the electrical signals. The transceiver 302 or the receiver 306 may convert the electrical signals to digital signals, and send the digital signals to the communication component 322. Alternatively or additionally, the communication component 322 may send the digital signals to the transceiver 302 or the transmitter 304. The transceiver 302 or the transmitter 304 may convert the digital signals to electrical signals and send to the RF front end 388. The RF front end 388 may filter and/or amplify the electrical signals. The RF front end 388 may send the electrical signals as electro-magnetic signals via the one or more antennas 365.

In certain implementations, the communication component 322, the transceiver 302, the receiver 306, the transmitter 308, the RF front end 388, the subcomponents of the RF front end 388, the processor 312, the memory 316, the modem 320, and/or the applications 375 may be configured to and/or may define means for communicating with the user equipment based on the C-DRX short cycle value and the averaging window value.

Figure 7:
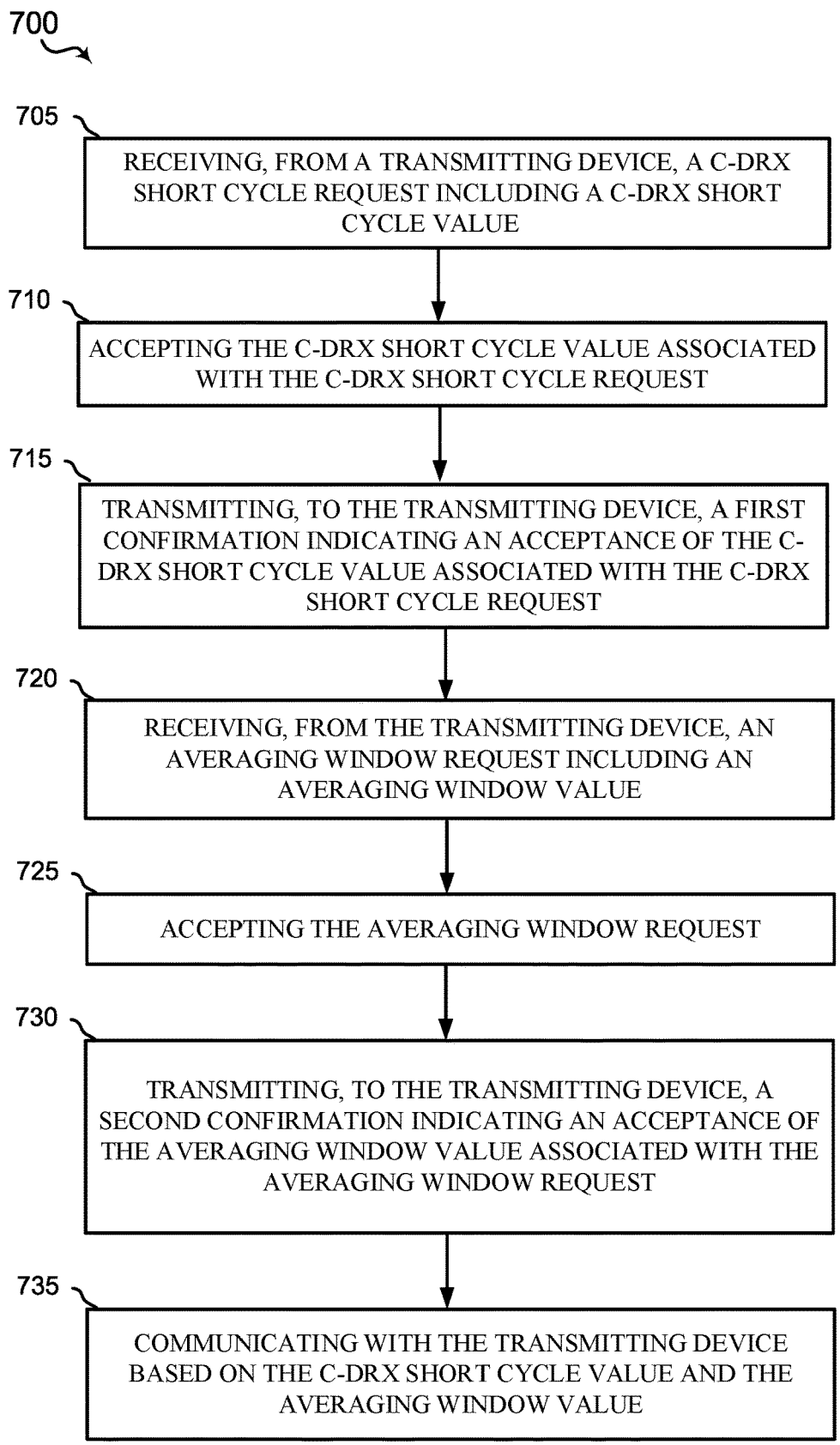
FIG. 7 illustrates an example of a method for accepting a C-DRX short cycle value and/or an averaging window value.

FIG. 7 illustrates an example of a method for accepting a C-DRX short cycle value and/or an averaging window value. The method 700 may be performed by a receiving device (such as the UE 110 or the BS 105). The receiving device may be accepting a C-DRX short cycle value and/or an averaging window value transmitted by a transmitting device. For example, the method 700 may be performed by the one or more of the processor 212, the memory 216, the applications 275, the modem 220, the transceiver 202, the receiver 206, the transmitter 208, the RF front end 288, the communication component 222, the determination component 224, and/or one or more other components of the UE 110 in the wireless communication network 100. Alternatively, the method 700 may be performed by the one or more of the processor 312, the memory 316, the applications 375, the modem 320, the transceiver 302, the receiver 306, the transmitter 308, the RF front end 388, the communication component 322, the determination component 324, and/or one or more other components of the BS 105 in the wireless communication network 100.

At block 705, the method 700 may include receiving, from a transmitting device a C-DRX short cycle request including a C-DRX short cycle value. For example, the communication component 222, the transceiver 202, the receiver 206, the transmitter 208, the RF front end 288, the subcomponents of the RF front end 288, the processor 212, the memory 216, the modem 220, and/or the applications 275 of the UE 110 may receive, from a transmitting device, a C-DRX short cycle request including a C-DRX short cycle value. In another example, the communication component 322, the transceiver 302, the receiver 306, the transmitter 308, the RF front end 388, the subcomponents of the RF front end 388, the processor 312, the memory 316, the modem 320, and/or the applications 375 of the BS 105 may receive, from a transmitting device, a C-DRX short cycle request including a C-DRX short cycle value.

At block 710, the method 700 may include accepting the C-DRX short cycle value associated with the C-DRX short cycle request. For example, the determination component 224, the processor 212, the memory 216, the modem 220, and/or the applications 275 of the UE 110 may accept the C-DRX short cycle value associated with the C-DRX short cycle request. In another example, the determination component 324, the processor 312, the memory 316, the modem 320, and/or the applications 375 of the BS 105 may accept the C-DRX short cycle value associated with the C-DRX short cycle request.

At block 715, the method 700 may transmit, to the transmitting device, a first confirmation indicating an acceptance of the C-DRX short cycle value associated with the C-DRX short cycle request. For example, the communication component 222, the transceiver 202, the receiver 206, the transmitter 208, the RF front end 288, the subcomponents of the RF front end 288, the processor 212, the memory 216, the modem 220, and/or the applications 275 of the UE 110 may transmit, to the transmitting device, a first confirmation indicating an acceptance of the C-DRX short cycle value associated with the C-DRX short cycle request. In another example, the communication component 322, the transceiver 302, the receiver 306, the transmitter 308, the RF front end 388, the subcomponents of the RF front end 388, the processor 312, the memory 316, the modem 320, and/or the applications 375 of the BS 105 may transmit, to the transmitting device, a first confirmation indicating an acceptance of the C-DRX short cycle value associated with the C-DRX short cycle request.

At block 720, the method 700 may receive, from the transmitting device, an averaging window request including an averaging window value. For example, the communication component 222, the transceiver 202, the receiver 206, the transmitter 208, the RF front end 288, the subcomponents of the RF front end 288, the processor 212, the memory 216, the modem 220, and/or the applications 275 of the UE 110 may receive, from the transmitting device, an averaging window request including an averaging window value. In another example, the communication component 322, the transceiver 302, the receiver 306, the transmitter 308, the RF front end 388, the subcomponents of the RF front end 388, the processor 312, the memory 316, the modem 320, and/or the applications 375 of the BS 105 may receive, from the transmitting device, an averaging window request including an averaging window value.

At block 725, the method 700 may accept the averaging window request. For example, the determination component 224, the processor 212, the memory 216, the modem 220, and/or the applications 275 of the UE 110 may accept the averaging window request. In another example, the determination component 324, the processor 312, the memory 316, the modem 320, and/or the applications 375 of the BS 105 may accept the averaging window request.

At block 730, the method 700 may transmit, to the transmitting device, a second confirmation indicating an acceptance of the averaging window value associated with the averaging window request. For example, the communication component 222, the transceiver 202, the receiver 206, the transmitter 208, the RF front end 288, the subcomponents of the RF front end 288, the processor 212, the memory 216, the modem 220, and/or the applications 275 of the UE 110 may transmit, to the transmitting device, a second confirmation indicating an acceptance of the averaging window value associated with the averaging window request. In another example, the communication component 322, the transceiver 302, the receiver 306, the transmitter 308, the RF front end 388, the subcomponents of the RF front end 388, the processor 312, the memory 316, the modem 320, and/or the applications 375 of the BS 105 may transmit, to the transmitting device, a second confirmation indicating an acceptance of the averaging window value associated with the averaging window request.

At block 735, the method 700 may communicate with the transmitting device based on the C-DRX short cycle value and the averaging window value. For example, the communication component 222, the transceiver 202, the receiver 206, the transmitter 208, the RF front end 288, the subcomponents of the RF front end 288, the processor 212, the memory 216, the modem 220, and/or the applications 275 of the UE 110 may communicate with the transmitting device based on the C-DRX short cycle value and the averaging window value. In another example, the communication component 322, the transceiver 302, the receiver 306, the transmitter 308, the RF front end 388, the subcomponents of the RF front end 388, the processor 312, the memory 316, the modem 320, and/or the applications 375 of the BS 105 may communicate with the transmitting device based on the C-DRX short cycle value and the averaging window value.

Additional Implementations

Aspects of the present disclosure include methods by a user equipment (UE) for determining a connected mode discontinuous reception (C-DRX) short cycle value, transmitting a C-DRX short cycle request to a base station, the C-DRX short cycle request including the C-DRX short cycle value, receiving a first confirmation indicating the base station accepting the C-DRX short cycle value associated with the C-DRX short cycle request, determining an averaging window value based on the C-DRX short cycle value, transmitting an averaging window request to the base station, the averaging window request including the averaging window value, receiving a second confirmation indicating the base station accepting the averaging window value associated with the averaging window request, and communicating with the base station based on the C-DRX short cycle value and the averaging window value.

Any of the methods above, wherein determining the C-DRX short cycle value comprises determining the C-DRX shorty cycle value based on at least one of a voice over New Radio (VoNR) latency request, a gaming voice latency request, or a voice real-time sample rate.

Any of the methods above, wherein determining the averaging window value comprises determining the averaging window value by multiplying the C-DRX short cycle value by a latency factor.

Any of the methods above, further comprising, prior to determining the averaging window value determining a previous averaging window value, transmitting a previous averaging window request to the base station, the previous averaging window request including the previous averaging window value, and receiving a rejecting indicating the base station rejecting the previous averaging window value associated with the previous averaging window request.

Any of the methods above, wherein determining the averaging window value comprises determining the averaging window value by incrementing the previous averaging window value.

Any of the methods above, wherein the previous averaging window value is a first integer multiple of the C-DRX shorty cycle value, and the averaging window value is a second integer multiple of the pervious averaging window value.

Any of the methods above, wherein the averaging window value is twice the previous averaging window value.

Any of the methods above, wherein the C-DRX shorty cycle value is between 1 and 50 milliseconds, and the averaging window value is between 1 and 500 milliseconds.

Any of the methods above, wherein communicating with the base station comprises transmitting or receiving data associated with voice over New Radio (VoNR) or ultra-reliable low-latency communication gaming voice.

Other aspects of the present disclosure include a user equipment (UE) having a memory comprising instructions, a transceiver, and one or more processors operatively coupled with the memory and the transceiver, the one or more processors configured to execute instructions in the memory to determine a connected mode discontinuous reception (C-DRX) short cycle value, transmit a C-DRX short cycle request to a base station, the C-DRX short cycle request including the C-DRX short cycle value, receive a first confirmation indicating the base station accepting the C-DRX short cycle value associated with the C-DRX short cycle request, determine an averaging window value based on the C-DRX short cycle value, transmit an averaging window request to the base station, the averaging window request including the averaging window value, receive a second confirmation indicating the base station accepting the averaging window value associated with the averaging window request, and communicate with the base station based on the C-DRX short cycle value and the averaging window value.

Any of the UEs above, wherein determining the C-DRX short cycle value comprises determining the C-DRX shorty cycle value based on at least one of a voice over New Radio (VoNR) latency request, a gaming voice latency request, or a voice real-time sample rate.

Any of the UEs above, wherein determining the averaging window value comprises determining the averaging window value by multiplying the C-DRX short cycle value by a latency factor.

Any of the UEs above, wherein the one or more processors are further configured to, prior to determining the averaging window value determine a previous averaging window value, transmit a previous averaging window request to the base station, the previous averaging window request including the previous averaging window value, and receive a rejecting indicating the base station rejecting the previous averaging window value associated with the previous averaging window request.

Any of the UEs above, wherein determining the averaging window value comprises determine the averaging window value by incrementing the previous averaging window value.

Any of the UEs above, wherein the previous averaging window value is a first integer multiple of the C-DRX shorty cycle value, and the averaging window value is a second integer multiple of the pervious averaging window value.

Any of the UEs above, wherein the averaging window value is twice the previous averaging window value.

Any of the UEs above, wherein the C-DRX shorty cycle value is between 1 and 50 milliseconds, and the averaging window value is between 1 and 500 milliseconds.

Any of the UEs above, wherein communicating with the base station comprises transmit or receive data associated with voice over New Radio (VoNR) or ultra-reliable low-latency communication gaming voice.

An aspect of the present disclosure includes a user equipment (UE) including means for determining a connected mode discontinuous reception (C-DRX) short cycle value, means for transmitting a C-DRX short cycle request to a base station, the C-DRX short cycle request including the C-DRX short cycle value, means for receiving a first confirmation indicating the base station accepting the C-DRX short cycle value associated with the C-DRX short cycle request, means for determining an averaging window value based on the C-DRX short cycle value, means for transmitting an averaging window request to the base station, the averaging window request including the averaging window value, means for receiving a second confirmation indicating the base station accepting the averaging window value associated with the averaging window request, and means for communicating with the base station based on the C-DRX short cycle value and the averaging window value.

Any of the UEs above, wherein means for determining the C-DRX short cycle value comprises means for determining the C-DRX shorty cycle value based on at least one of a voice over New Radio (VoNR) latency request, a gaming voice latency request, or a voice real-time sample rate.

Any of the UEs above, wherein means for determining the averaging window value comprises means for determining the averaging window value by multiplying the C-DRX short cycle value by a latency factor.

Any of the UEs above, further comprising, prior to determining the averaging window value determining a previous averaging window value, means for transmitting a previous averaging window request to the base station, the previous averaging window request including the previous averaging window value, and means for receiving a rejecting indicating the base station rejecting the previous averaging window value associated with the previous averaging window request.

Any of the UEs above, wherein means for determining the averaging window value comprises means for determining the averaging window value by incrementing the previous averaging window value.

Any of the UEs above, wherein the previous averaging window value is a first integer multiple of the C-DRX shorty cycle value, and the averaging window value is a second integer multiple of the pervious averaging window value.

Any of the UEs above, wherein the averaging window value is twice the previous averaging window value.

Any of the UEs above, wherein the C-DRX shorty cycle value is between 1 and 50 milliseconds, and the averaging window value is between 1 and 500 milliseconds.

Any of the UEs above, wherein means for communicating with the base station comprises means for transmitting or receiving data associated with voice over New Radio (VoNR) or ultra-reliable low-latency communication gaming voice.

Some aspects of the present disclosure include non-transitory computer readable media having instructions stored therein that, when executed by one or more processors of a user equipment (UE), cause the one or more processors to determine a connected mode discontinuous reception (C-DRX) short cycle value, transmit a C-DRX short cycle request to a base station, the C-DRX short cycle request including the C-DRX short cycle value, receive a first confirmation indicating the base station accepting the C-DRX short cycle value associated with the C-DRX short cycle request, determine an averaging window value based on the C-DRX short cycle value, transmit an averaging window request to the base station, the averaging window request including the averaging window value, receive a second confirmation indicating the base station accepting the averaging window value associated with the averaging window request, and communicate with the base station based on the C-DRX short cycle value and the averaging window value.

Any of the non-transitory computer readable media above, wherein the instructions for determining the C-DRX short cycle value comprises instructions for determining the C-DRX shorty cycle value based on at least one of a voice over New Radio (VoNR) latency request, a gaming voice latency request, or a voice real-time sample rate.

Any of the non-transitory computer readable media above, wherein the instructions for determining the averaging window value comprises instructions for determining the averaging window value by multiplying the C-DRX short cycle value by a latency factor.

Any of the non-transitory computer readable media above, further comprising instructions, when executed by the one or more processors, cause the one or more processors to, prior to determining the averaging window value determine a previous averaging window value, transmit a previous averaging window request to the base station, the previous averaging window request including the previous averaging window value, and receive a rejecting indicating the base station rejecting the previous averaging window value associated with the previous averaging window request.

Any of the non-transitory computer readable media above, wherein the instructions for determining the averaging window value comprises instructions for determine the averaging window value by incrementing the previous averaging window value.

Any of the non-transitory computer readable media above, wherein the previous averaging window value is a first integer multiple of the C-DRX shorty cycle value, and the averaging window value is a second integer multiple of the pervious averaging window value.

Any of the non-transitory computer readable media above, wherein the averaging window value is twice the previous averaging window value.

Any of the non-transitory computer readable media above, wherein the C-DRX shorty cycle value is between 1 and 50 milliseconds, and the averaging window value is between 1 and 500 milliseconds.

Any of the non-transitory computer readable media above, wherein the instructions for communicating with the base station comprises instructions for transmit or receive data associated with voice over New Radio (VoNR) or ultra-reliable low-latency communication gaming voice.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. For example, changes may be made in the function and arrangement of elements discussed without departing from the scope of the disclosure. Also, various examples may omit, substitute, or add various procedures or components as appropriate. For instance, the methods described may be performed in an order different from that described, and various steps may be added, omitted, or combined. Also, features described with respect to some examples may be combined in other examples. In some instances, well-known structures and apparatuses are shown in block diagram form in order to avoid obscuring the concepts of the described examples.

It should be noted that the techniques described herein may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP LTE and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description herein, however, describes an LTE/LTE-A system or 5G system for purposes of example, and LTE terminology is used in much of the description below, although the techniques may be applicable other next generation communication systems.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above may be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that may be accessed by a general purpose or special purpose computer. By way of example, and not limitation, computer-readable media may comprise RAM, ROM, EEPROM, CD-ROM or other optical disk storage, magnetic disk storage or other magnetic storage devices, or any other medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects may be described or claimed in the singular, the plural is contemplated unless limitation to the singular is explicitly stated. Additionally, all or a portion of any aspect may be utilized with all or a portion of any other aspect, unless stated otherwise. Thus, the disclosure is not to be limited to the examples and designs described herein but is to be accorded the widest scope consistent with the principles and novel features disclosed herein.

What is claimed is:

1. A method of wireless communication by a user equipment (UE) in a network, comprising:
    determining a connected mode discontinuous reception (C-DRX) short cycle value;
    transmitting a C-DRX short cycle request to a base station, the C-DRX short cycle request including the C-DRX short cycle value;
    receiving a first confirmation indicating the base station accepting the C-DRX short cycle value associated with the C-DRX short cycle request;
    determining an averaging window value based on the C-DRX short cycle value;
    transmitting an averaging window request to the base station, the averaging window request including the averaging window value;
    receiving a second confirmation indicating the base station accepting the averaging window value associated with the averaging window request; and
    communicating with the base station based on the C-DRX short cycle value and the averaging window value.

2. The method of claim 1, wherein determining the C-DRX short cycle value comprises:
    determining the C-DRX shorty cycle value based on at least one of a voice over New Radio (VoNR) latency request, a gaming voice latency request, or a voice real-time sample rate.

3. The method of claim 1, wherein determining the averaging window value comprises:
    determining the averaging window value by multiplying the C-DRX short cycle value by a latency factor.

4. The method of claim 1, further comprising, prior to determining the averaging window value:
    determining a previous averaging window value;
    transmitting a previous averaging window request to the base station, the previous averaging window request including the previous averaging window value; and
    receiving a rejecting indicating the base station rejecting the previous averaging window value associated with the previous averaging window request.

5. The method of claim 4, wherein determining the averaging window value comprises:
    determining the averaging window value by incrementing the previous averaging window value.

6. The method of claim 5, wherein:
    the previous averaging window value is a first integer multiple of the C-DRX shorty cycle value; and
    the averaging window value is a second integer multiple of the pervious averaging window value.

7. The method of claim 5, wherein:
    the averaging window value is twice the previous averaging window value.

8. The method of claim 1, wherein:
    the C-DRX shorty cycle value is between 1 and 50 milliseconds; and
    the averaging window value is between 1 and 500 milliseconds.

9. The method of claim 1, wherein communicating with the base station comprises:
    transmitting or receiving data associated with voice over New Radio (VoNR) or ultra-reliable low-latency communication gaming voice.

10. A user equipment (UE), comprising:
    a memory comprising instructions;
    a transceiver; and
    one or more processors operatively coupled with the memory and the transceiver, the one or more processors configured to execute instructions in the memory to:
        determine a connected mode discontinuous reception (C-DRX) short cycle value;
        transmit a C-DRX short cycle request to a base station, the C-DRX short cycle request including the C-DRX short cycle value;
        receive a first confirmation indicating the base station accepting the C-DRX short cycle value associated with the C-DRX short cycle request;
        determine an averaging window value based on the C-DRX short cycle value;
        transmit an averaging window request to the base station, the averaging window request including the averaging window value;
        receive a second confirmation indicating the base station accepting the averaging window value associated with the averaging window request; and
        communicate with the base station based on the C-DRX short cycle value and the averaging window value.

11. The UE of claim 10, wherein determining the C-DRX short cycle value comprises:
    determining the C-DRX shorty cycle value based on at least one of a voice over New Radio (VoNR) latency request, a gaming voice latency request, or a voice real-time sample rate.

12. The UE of claim 10, wherein determining the averaging window value comprises:
    determining the averaging window value by multiplying the C-DRX short cycle value by a latency factor.

13. The UE of claim 10, wherein the one or more processors are further configured to, prior to determining the averaging window value:
    determine a previous averaging window value;
    transmit a previous averaging window request to the base station, the previous averaging window request including the previous averaging window value; and
    receive a rejecting indicating the base station rejecting the previous averaging window value associated with the previous averaging window request.

14. The UE of claim 13, wherein determining the averaging window value comprises:
    determine the averaging window value by incrementing the previous averaging window value.

15. The UE of claim 14, wherein:
    the previous averaging window value is a first integer multiple of the C-DRX shorty cycle value; and
    the averaging window value is a second integer multiple of the pervious averaging window value.

16. The UE of claim 15, wherein:
    the averaging window value is twice the previous averaging window value.

17. The UE of claim 10, wherein:
the C-DRX shorty cycle value is between 1 and 50 milliseconds; and
the averaging window value is between 1 and 500 milliseconds.

18. The UE of claim 10, wherein communicating with the base station comprises:
transmit or receive data associated with voice over New Radio (VoNR) or ultra-reliable low-latency communication gaming voice.

19. A non-transitory computer readable medium having instructions stored therein that, when executed by one or more processors of a user equipment (UE), cause the one or more processors to:
determine a connected mode discontinuous reception (C-DRX) short cycle value;
transmit a C-DRX short cycle request to a base station, the C-DRX short cycle request including the C-DRX short cycle value;
receive a first confirmation indicating the base station accepting the C-DRX short cycle value associated with the C-DRX short cycle request;
determine an averaging window value based on the C-DRX short cycle value;
transmit an averaging window request to the base station, the averaging window request including the averaging window value;
receive a second confirmation indicating the base station accepting the averaging window value associated with the averaging window request; and
communicate with the base station based on the C-DRX short cycle value and the averaging window value.

20. The non-transitory computer readable medium of claim 19, wherein the instructions for determining the C-DRX short cycle value comprises instructions for:
determining the C-DRX shorty cycle value based on at least one of a voice over New Radio (VoNR) latency request, a gaming voice latency request, or a voice real-time sample rate.

21. The non-transitory computer readable medium of claim 19, wherein the instructions for determining the averaging window value comprises instructions for:
determining the averaging window value by multiplying the C-DRX short cycle value by a latency factor.

22. The non-transitory computer readable medium of claim 19, further comprising instructions, when executed by the one or more processors, cause the one or more processors to, prior to determining the averaging window value:
determine a previous averaging window value;
transmit a previous averaging window request to the base station, the previous averaging window request including the previous averaging window value; and
receive a rejecting indicating the base station rejecting the previous averaging window value associated with the previous averaging window request.

23. The non-transitory computer readable medium of claim 22, wherein the instructions for determining the averaging window value comprises instructions for:
determine the averaging window value by incrementing the previous averaging window value.

24. The non-transitory computer readable medium of claim 23, wherein:
the previous averaging window value is a first integer multiple of the C-DRX shorty cycle value; and
the averaging window value is a second integer multiple of the pervious averaging window value.

25. The non-transitory computer readable medium of claim 23, wherein:
the averaging window value is twice the previous averaging window value.

26. The non-transitory computer readable medium of claim 19, wherein:
the C-DRX shorty cycle value is between 1 and 50 milliseconds; and
the averaging window value is between 1 and 500 milliseconds.

27. The non-transitory computer readable medium of claim 19, wherein the instructions for communicating with the base station comprises instructions for:
transmit or receive data associated with voice over New Radio (VoNR) or ultra-reliable low-latency communication gaming voice.

28. A user equipment (UE), comprising:
means for determining a connected mode discontinuous reception (C-DRX) short cycle value;
means for transmitting a C-DRX short cycle request to a base station, the C-DRX short cycle request including the C-DRX short cycle value;
means for receiving a first confirmation indicating the base station accepting the C-DRX short cycle value associated with the C-DRX short cycle request;
means for determining an averaging window value based on the C-DRX short cycle value;
means for transmitting an averaging window request to the base station, the averaging window request including the averaging window value;
means for receiving a second confirmation indicating the base station accepting the averaging window value associated with the averaging window request; and
means for communicating with the base station based on the C-DRX short cycle value and the averaging window value.

29. The UE of claim 28, wherein means for determining the C-DRX short cycle value comprises:
means for determining the C-DRX shorty cycle value based on at least one of a voice over New Radio (VoNR) latency request, a gaming voice latency request, or a voice real-time sample rate.

30. The UE of claim 28, wherein means for determining the averaging window value comprises:
means for determining the averaging window value by multiplying the C-DRX short cycle value by a latency factor.

31. The UE of claim 28, further comprising, prior to determining the averaging window value:
means for determining a previous averaging window value;
means for transmitting a previous averaging window request to the base station, the previous averaging window request including the previous averaging window value; and
means for receiving a rejecting indicating the base station rejecting the previous averaging window value associated with the previous averaging window request.

32. The UE of claim 31, wherein means for determining the averaging window value comprises:
means for determining the averaging window value by incrementing the previous averaging window value.

33. The UE of claim 32, wherein:
the previous averaging window value is a first integer multiple of the C-DRX shorty cycle value; and
the averaging window value is a second integer multiple of the pervious averaging window value.

34. The UE of claim 32, wherein:
the averaging window value is twice the previous averaging window value.

35. The UE of claim 28, wherein:
the C-DRX shorty cycle value is between 1 and 50 milliseconds; and
the averaging window value is between 1 and 500 milliseconds.

36. The UE of claim 28, wherein means for communicating with the base station comprises:
means for transmitting or receiving data associated with voice over New Radio (VoNR) or ultra-reliable low-latency communication gaming voice.

\* \* \* \* \*